May 30, 1967  B. R. REIMER  3,321,936
RATCHET TYPE TORQUE OVERLOAD DEVICE
Filed Aug. 3, 1965  3 Sheets-Sheet 1

INVENTOR.
BORGE R. REIMER
BY Harold E. Hall
Walter E. Pavlick
ATTORNEYS

INVENTOR.
BORGE R. REIMER
BY Harold D. Steel
Walter E. Pavlick
ATTORNEYS

May 30, 1967 B. R. REIMER 3,321,936
RATCHET TYPE TORQUE OVERLOAD DEVICE

Filed Aug. 3, 1965 3 Sheets-Sheet 3

INVENTOR.
BORGE R. REIMER
BY Harold D. Hall
Walter E. Pavlick
ATTORNEYS

United States Patent Office 3,321,936
Patented May 30, 1967

3,321,936
RATCHET TYPE TORQUE OVERLOAD DEVICE
Borge R. Reimer, St. Catharines, Ontario, Canada, assignor to Hayes-Dana Limited, Thorold, Ontario, Canada, a corporation of Canada
Filed Aug. 3, 1965, Ser. No. 477,039
9 Claims. (Cl. 64—29)

This invention relates to torque overload devices in general and more particularly to a device of the type wherein a pair of members are drivingly connected in a torque transferring relationship by ratchet type torque transferring means and is operative to become disengaged upon attainment of preselected torque level.

The prior art discloses many different types of ratchet type clutch overload devices. Some of these types comprise merely a set of jaws which are spring loaded against each other while other types are provided with a plurality of individual driving means for coupling the driving member to the driven member; for example cammable means in the form of balls, rollers and the like are constantly disposed in openings in a drive plate connected to one of the members and are adapted to engage camming means on the other member and a pressure plate provides a load on the cammable means to maintain the same in driving engagement with the camming means. In this type of device a compression spring is merely used to load the pressure plate and in turn the cammable means.

In agricultural drive line applications, for example, sudden overloading or jamming of the implement driven thereby will sooner or later occur. These overloads can be and often are of major proportions; however, in devices where steel compression springs are used to load the pressure plate, the instantaneous torque values resulting from attempts of the clutch to re-engaging after the breakaway point has been past, i.e., after the cammable means have been cammed into a nondriving relationship, greatly exceeds the torque values at the breakout point and inhibit re-engagement of the clutch; the breakaway point being considered as the dynamic torque value at which the clutch will cease to transmit torque. Further, the re-engagement torque level of these devices utilizing steel springs increases as a function of time that the clutch is allowed to slip, resulting from the breakdown of lubricant which takes place at the point or line contact between the torque transmitting elements of the clutch if the clutch is allowed to slip for any period of time due to the high initial and the continuous re-engagement load of the steel spring.

Another disadvantage of the prior art overload coupling devices, particularly those used in the agricultural drive lines, is that they are not effectively sealed in a simple manner against the ingress of dirt or the egress of lubricant. These devices either require a separate seal or enclosure or they have no seals at all.

It is therefore an object of this invention to provide a torque overload coupling device wherein the instantaneous torque value resulting from attempts of the device to re-engage is less than the breakaway torque value.

It is also an object of this invention to provide such a coupling device wherein the breakout torque value is maintained substantially constant regardless of the torque buildup time required to reach the breakaway point.

It is another object of this invention to provide a torque overload coupling device with means that minimize the hammering effect of the clutch as it attempts to re-engage when the breakaway point has been passed.

Another object of this invention is to provide a torque overload coupling device wherein the coupling means, when disengaged and during disengagement, can freely roll without causing excessive wear of the rotative loading parts.

Yet another object of this invention is to provide a torque overload coupling device with resilient loading means having portions which also function as a seal.

Yet a further object of this invention is to provide a torque overload coupling device with means which allows the resilient means more freedom of movement.

Still another object of this invention is to provide a complete and inexpensive torque overload coupling device which is compact, durable, adequately sealed and protected from the action of the elements.

Further objects and other advantages of this invention will become apparent upon completion of the detailed specification when taken in consideration with the following drawings wherein.

Figure 3:
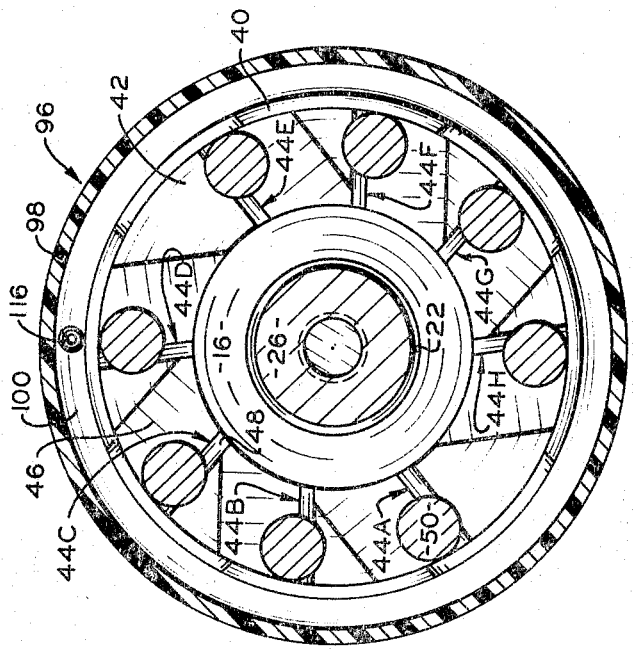
Figure 1:
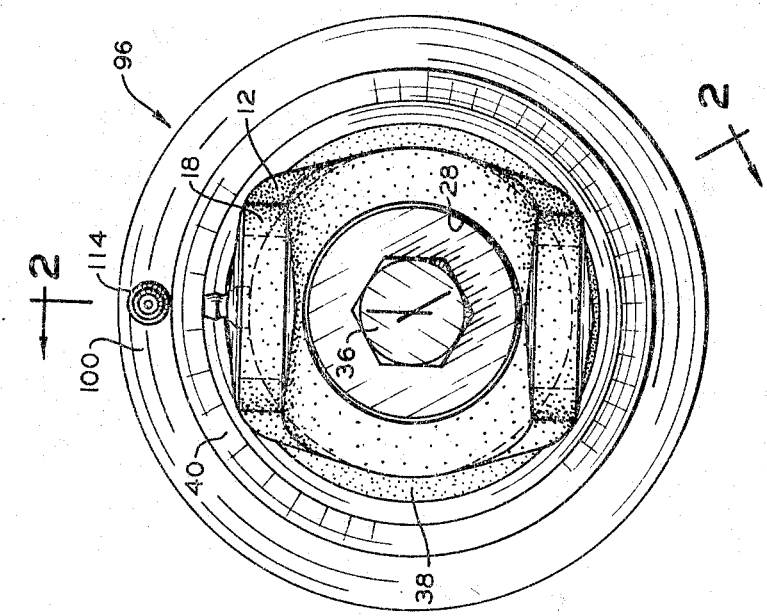
FIG. 1 is an end elevational view of a portion of a drive line incorporating a torque overload device according to this invention.
Figure 2:
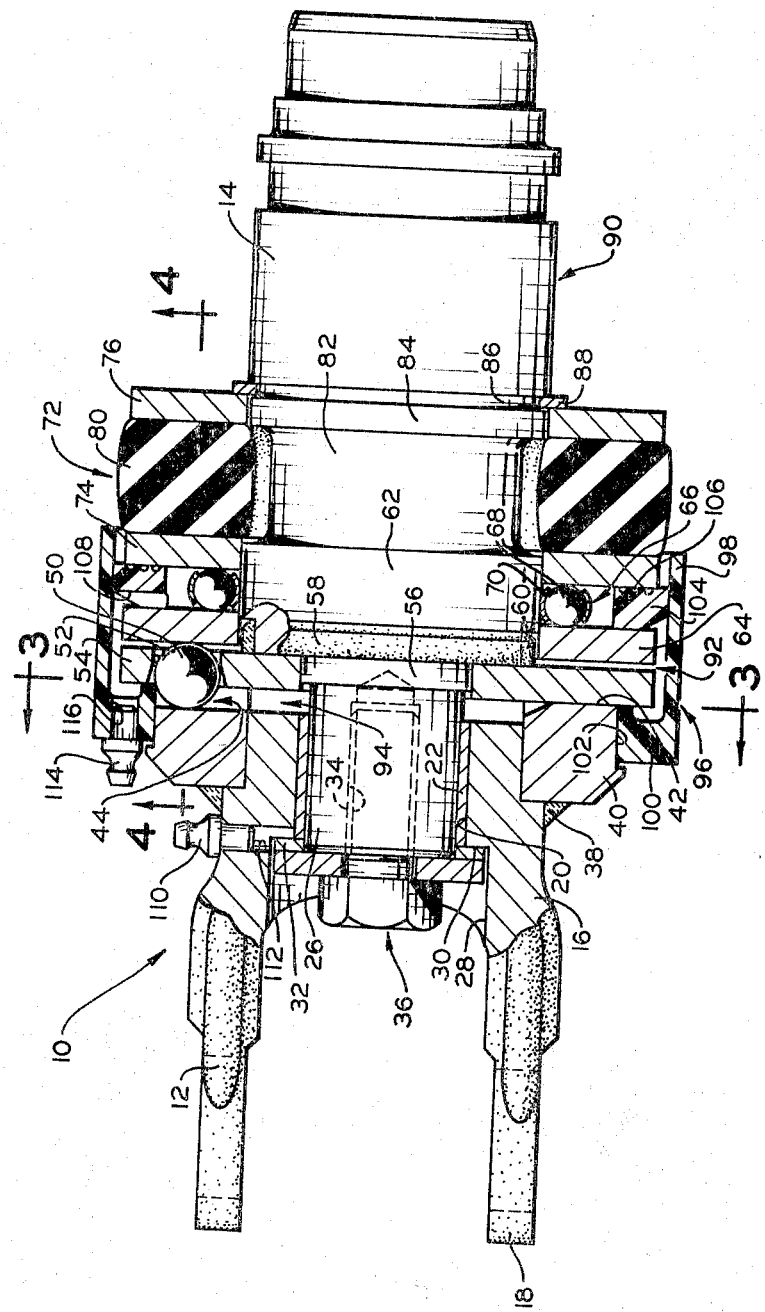
FIG. 2 is a view taken along the line 2—2 of FIG. 1.
Figure 5:
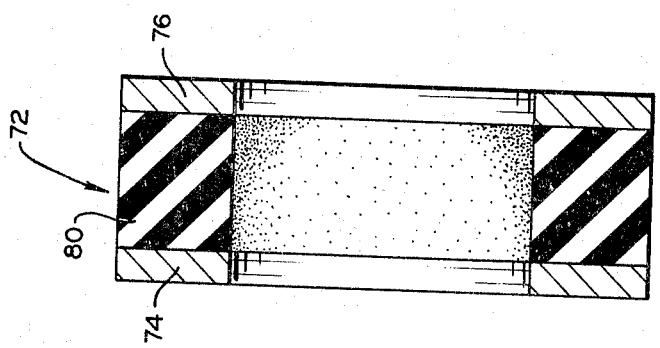
Figure 4:
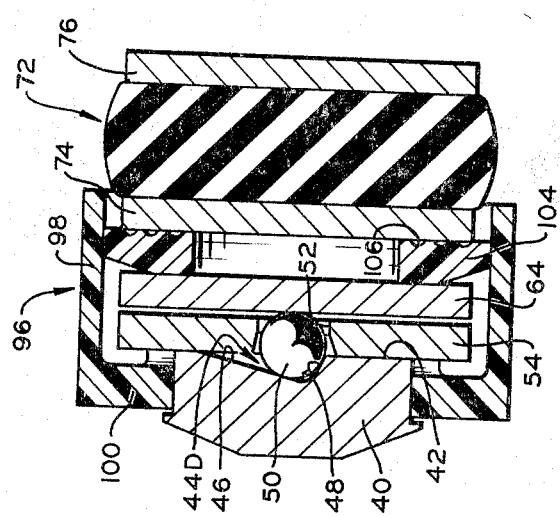

FIGS. 3 and 4 are views of the structure shown in FIG. 1 taken respectively along the lines 3—3 and 4—4 in FIG. 2; and FIG. 5 is a longitudinal cross-sectional view of the resilient means.

Referring to the drawings, a portion of a drive line is shown generally at 10 and includes a driving member 12 and a driven member 14 arranged coaxially therewith; it being understood that the capacity of the members 12 and 14 regarding which is the driving and which is the driven member is immaterial for the purposes of this invention and the function of these members may be reversed. The driven member 12 includes a shaft portion 16 having axially extending therefrom a pair of radially opposed lugs 18 for the purpose of conventionally connecting the portion 10 to a remaining portion of the drive line as by a journal cross of a universal joint (not shown).

The shaft portion 16 has provided therein a centrally disposed axially extending bore 20 rotatably receiving an annular bushing 22 made of a suitable anti-friction material such as bronze. The bushing 22 is pressingly secured on a reduced diameter first portion or inner end 26 of the driven member 14 so the portion 26 and thus, the driven member 14 are rotatably carried by the driving member 12. The member 12 is provided with a counterbore 28 extending outwardly from the outer end of the bore 20 forming a radially extending annular shoulder 30 between the bore and counterbore, against which shoulder is disposed in an anti-friction relationship an annular thrust washer 32 carried by the portion 26. The first portion 26 is supplied with a central threaded opening 34 extending outwardly from the inner end thereof, which opening threadedly receives a bolt and washer assembly 36; the latter engaging the thrust washer 32 and pressing the same against the bushing 22 to fixedly position the washer relative to the portion 26, so that the engagement between the washer and the shoulder 30 inhibits movement to the right or outward movement of the driven member 14 relative to the driving member 12.

The shaft portion 16 has peripherally secured thereto, as by an annular weld shown generally at 38, an annular radially outwardly extending flange 40; it being understood that the flange 40 and shaft 16 have been shown as separate pieces for ease of manufacture and such could be formed as a unitary structure if desired. Formed in the right face 42 of the flange 40 are a plurality of circumferentially spaced camming means indicated collectively at 44 in FIG. 2.

As shown in FIG. 3, camming means 44A, 44B, 44C and 44D of a first set of camming means are spaced equally from each other as are camming means 44E, 44F, 44G and 44H of a second set of camming means; the spacings in both of said sets preferably being equal in size; however, the spaces between the first and second sets are larger than said equal spacings, that is, the space between the camming means 44D and 44E and between the camming means 44A and 44H are larger in size. With reference to FIGS. 3 and 4, each of the camming means is formed intermediate adjacent circumferentially spaced portions of the right face 42 of the flange 40 and commence on the clockwise side thereof, as viewed in FIG. 3, in an inwardly gradually sloping camming incline 46 and terminate on the counterclockwise side thereof in a rapidly outwardly sloping camming shoulder 48. The axial depth of each camming means 44 is such that a cammable means in the form of a ball 50, when disposed therein as most clearly seen in FIG. 4, is positioned such that more than half of the ball 50 is projecting axially to the right or outwardly from the face 42. As viewed in FIG. 3, if the balls 50 are maintained stationary relative to the flange 40 and the flange is rotated clockwise, the balls 50 will be urged up the cam shoulder 48 and axially outwardly from the camming means 44 and thus be juxtaposed the adjoining portion of the face 42 disposed counterclockwise of the camming means, while upon counterclockwise movement of the flange 40 the balls 50 will move up the camming incline 46 and gradually axially outwardly from the camming means 44 until the same is juxtaposed the portion of the face 42 clockwise from the camming means 44. Since the angle of inclination of the camming incline 46 and the camming shoulder 48 are substantially different, it is much easier for the flange 40 to rotate counterclockwise relative to the balls 50 in an overrunning manner than it is for the same to rotate clockwise relative thereto.

The balls 50 are displaced radially outwardly at an equal distance from the longitudinal axis of the member 14 and are each positioned in one of a plurality of openings 52 extending axially through a connecting element in the form of an annular flange 54 positioned on a second portion 56 of the member 14 immediately to the right or outwardly from the inner end 26 thereof. A third portion 58 is provided on the member 14 immediately to the right of and slightly greater in diameter than the second portion 56, and an annular weld 60 between the periphery of the portion 58 and the adjoining portion of the flange 54 integrally secures the latter to the member 14.

The openings 52 are bell mouthed on the left side thereof and, since each opening 52 contains a ball 50, when the balls 50 are positioned as shown in FIGS. 2–4, that is disposed within the camming means 44 in registration therewith, one of the openings 54 is disposed in cooperative registering relationship with each of the camming means 44 so that the circumferential spacings of the openings 54 correspond to the spacings of the camming means 44. Additionally, as seen in FIGS. 2 and 4, when the balls 50 are disposed within the camming means 44, a portion thereof projects axially to the right of or outwardly from the flange 54.

A fourth portion 62 of the member 14 is disposed immediately to the right of the third portion 58 and has a slightly greater diameter with respect thereto, the periphery of the weld 60 having been machined below the periphery of the portion 62, and pilotingly received on the fourth portion for rotation relative thereto is an annular pressing member or pressure plate 64 which engages the right side of the balls 50 projecting beyond the flange 54.

Disposed immediately to the right of the pressing member 64 is a thrust bearing shown generally at 66 including a plurality of circumferentially spaced ball bearings 68 and a circumferentially extending cage 70 conventionally retaining the same in a spaced relationship, the ball bearings 68 engaging the right side of the member 64 in a rolling and thrusting relationship, and the balls being radially positioned by means of the cage 70 thereof pilotingly and axially movably engaging the fourth portion 62 of the member 14. Resilient means shown generally at 72 are provided to press against the right side of the ball bearings 68 and thereby urge the pressing member 64 and the balls 50 engaged thereby axially to the left or inwardly. More particularly, the resilient means 72 comprise a pair of axially spaced annular metallic elements 74 and 76 having disposed axially intermediate the same and bonded thereto an annular elastomeric resilient element 80. As seen in FIG. 5, in the free or uncompressed condition, the external and internal diameters of the metallic elements 74 and 76 and of the resilient element 80 are substantially equal. The metallic element 74 is pilotingly received on the fourth portion 62 in a closely spaced relationship and adapted to move axially relative thereto in an unrestricted manner, while the left face thereof is in pressing engagement with the right side of the roller bearings 68. A fifth portion 82 of the member 14 immediately to the right of the portion 62 and peripherally surrounded by the resilient element 80 has a diameter which is substantially reduced with respect to the diameter of the portion 62, and a sixth portion 84 of the member 14, which is disposed immediately to the right of the portion 82 and the resilient element 80 and peripherally surrounded by the metallic element 76, has substantially the same diameter as the portion 62 and receives thereon in a closely fitting and sealing relationship the annular element 76. Immediately to the right of the sixth portion 84 is an annular groove 86 formed in the periphery of the member 14 with the left side thereof being positioned axially to the left of the right face of the annular element 76, while the right side of the groove 86 is positioned axially to the right of the member 76. Conventionally disposed in the groove 86 is a snap ring 88 which engages the right side of the groove 86 thereby inhibiting movement of the element 76 to the right relative to the member 14. A seventh portion 90 of the member 14 to the right of the groove 86 is adapted for securement thereto of another portion of the drive line (not shown).

The axial distance between the bottom of the camming means 44 and the left side of the snap ring 88 is dimensioned, so that when the coupling device 94 is assembled and in its operative position shown in FIG. 2, the resilient means 72 is preloaded and the resilient element 80 is axially compressed and has expanded radially inwardly and outwardly as a result of this compression; the fifth portion 82 of the shaft 14, as a result of its reduced diameter, easily accommodating the radially inward expansion of the resilient element 80. Since the resilient means 72 is axially compressed, the same reacts against the snap ring 88 and through the ball bearings 66 against the pressing member 64 to press the balls 50 into resilient engagement with the bottom of the camming means 44 so that the cammable means or balls 50 connect the camming means, and thereby the driving member 12, to the flange 54 and through the latter to the driven member 14.

Upon the driving member 12 transmitting torque to the driven member 14 by rotating in a counterclockwise direction, when viewed from the left in FIG. 2, the camming shoulder 48 torsionally drives the balls 50 counterclockwise, and the latter in turn transmit torque to the flange 54 and driven member 14. The reaction of the torsional load transfer between the camming shoulder 48 and the balls 50 induces the balls to move up the camming shoulder and axially out of the camming means 44, which axial movement is inhibited by the resilient biasing affect of the resilient means 72 upon the pressing member 64 which is in engagement with the right side of the balls 50. When the torsional load increases to the extent that the reaction between the balls 50 and the camming shoulder 48 is sufficiently great so that the balls 50 are cammed out of the camming means 44, by urging the pressing member 64 axially to the right against the biasing affect of the resilient means 72, the driving member 12 is then disconnected from its driving relationship with the driven member 14 and may rotate counterclockwise relative thereto. Since the camming means 44 and the balls 50 are arranged in two sets with the spaces in between the sets different from the spaces in between the camming means of each set and, in the preferred embodiment, with equal spacings between the two sets, the driving member 12 will rotate 180° relative to the driven member 14 before all the balls 50 are again in registration with all the camming means 44 and may enter the same simultaneously; it being understood that at the times when all the balls 50 are not thus in registration the resilient means will not be operative to bias the registering balls into the particular camming means in registration therewith. With this arrangement, re-engagement can only occur in the original registered position or in a position 180° relative thereto so that the lugs 18 of the driven member 12 will remain in phase with the remaining portion of the drive line (not shown) secured to the seventh portion 90 of the driven member 14. If the spacings between the two sets of camming means, instead of being equal as described above, are unequal then engagement will only occur at the original registrating in phase position. Additionally, if all the camming means 44 are equally spaced, then registration can occur in many positions of relative rotation and at such re-engagement the driving and driven members 12 and 14 will not necessarily be in phase.

Upon movement to the right of the balls 50 as a result of the camming action between the same and the camming shoulders 48, the pressing member 64 is urged axially to the right and, through the implement of the ball bearings 68, urges the metallic element 74 axially to the right thereby further compressing the resilient element 80 of the resilient means 72. During such compression, the resilient element 72 further expands both radially inwardly and radially outwardly and the inward expansion is easily accommodated as a result of the reduced diameter of the fifth portion 82 while the metallic element 74 slides along the periphery of the fourth portion 62.

Means provide a sealed chamber indicated generally at 92 containing the camming and cammable means 44 and 50, the connecting means 54, the pressing means 64, the thrust bearing 66 and the sliding engagement between the resilient means 72 and the fourth and fifth portions 62 and 82, thereby insuring the retention of lubricant therewithin and the exclusion of contaminants from the various members contained within the sealed chamber so that the coupling device 94 will operate satisfactorily for prolonged periods.

More particularly, an annular boot 96 peripherally surrounds portions of the coupling device 94 and includes an axially elongated cylindrical portion 98 circumferentially overlying and radially spaced from the camming and cammable means 44 and 50, the flange 54, the pressing means 64, the thrust bearing 66 and the annular element 74, and a circumferential lip portion 100 formed integrally with the cylindrical portion 98 and extending radially inwardly therefrom and into a pressing and sealing engagement with a land area 102 formed peripherally on the annular flange 40. The boot 96 is preferably made from a substantially rigid yet somewhat elastic plastic which is highly resistant to the action of the elements, such as nylon, and the internal diameter of the lip 100 is made slightly smaller than the external diameter of the flange 40 at the land 102, so that when the boot 96 is positioned on the land 102 the pressing and sealing relationship exists.

The boot 96 also includes an annular portion 104 formed separately from the cylinder 96 and positioned axially intermediate the pressing member 64 and the metallic element 74. The annular portion 104 has an external diameter which is slightly greater than the internal diameter of the cylindrical portion 98 so that a resilient sealing fit exists therebetween; the portion 104 also being made from a substantially rigid yet resilient plastic, such as nylon, and as a result of the relatively low friction properties of this material, the annular portion 104 and the cylindrical portion 98, while being in a pressing and sealing relationship, can easily rotate and move axially relative to each other.

Preferably, the annular portion 104 is formed with an axial dimension slightly greater than the diameter of the roller bearings 68 so that a pressing and sealing relationship exists between the annular portion 104 and the pressing member 64 and metallic element 74; the external diameter of the annular portion 104 being sufficiently greater than the external diameter of the resilient means 72 so that the same maintains the cylindrical portion 98 radially spaced from the periphery of the resilient means 72 in order that the cylindrical portion will not engage and interfere with movement of the resilient means relative thereto.

The annular portion 104 has a plurality of concentric annular grooves 106 formed in the right face thereof which engages the metallic element 74 so as to form a labyrinth or lip type seal therewith and, additionally, has a plurality of circumferentially spaced radially extending openings 108 therein to provide for the passage of lubricant therethrough. When the coupling device 94 is in the uncoupled condition, that is, the cammable means 50 having been cammed out of the camming means 44 so that the driving and driven members 12 and 14 rotate relative to each other, the annular portion 104 of the boot 96, being axially compressed between the pressing member 64 and metallic element 74, rotates with the driven member 14 while the cylindrical portion 96 rotates with the driving member 10 and relative to the annular portion 106.

Means are provided for lubricating the rotating engagement between the bushing 22 and the bore 20 in the driving member 12 and between the thrust washer 32 and the shoulder 30 formed in the member 12 and includes a lubricating fitting 110 secured in a radially extending opening 112, which opening joins the fitting in a confluent relationship with the periphery of the bushing 22 and the area of engagement between the thrust washer 32 and the shoulder 30; there being a small space between the periphery of the thrust washer 32 and the bolt and washer assembly 36 and the internal surface of the bore 28 for bleed-off purposes during lubrication. Means are also provided for lubricating the various components of the coupling device 94 and includes a second lubricating fitting 114 secured in an axially extending opening 116 formed in the lip portion 100 of the boot 96. Lubricant entering the sealed chamber 92 through the fitting 114 and opening 116 may thus directly reach the camming and cammable means 44 and 50 the annular flange 54 and the left side of the pressing member 64 and by passing radially inwardly through the openings 108 in the annular portion 104 of the boot may reach the area of the thrust bearing 66 and the peripheral surface of the fourth portion 62 of the member 14 upon which the pressing member 64 and metallic member 74 slide axially. To accommodate bleed-off, the cylindrical portion 96 will flex radially outwardly relative to the annular portion 104 to provide a space therebetween. Additionally, the lubricant in the openings 108 lubricates the right face of the pressing member 64, which lubricant, combined with the low friction of the plastic annular portion 108, allows the pressure member to rotate with little effort relative to the annular portion 106.

The means providing the sealed chamber indicated generally at 90, in addition to the boot 96 also includes the resilient means 72, the latter being sealingly connected to the annular portion 104 of the boot by means of the engagement between the annular metallic element 74 and the annular portion 104, and also sealingly connected to the driven member 114 by means of the sealing engagement between the annular metallic element 76 of the resilinet means 72 and the sixth portion 84 of the driven member 14.

Thus the resilient means 72, the elastomeric portion 80 thereof being preferably made from a resilient elastomer which is highly resistant to the action of the elements, not only functions to maintain the camming and cammable means 44 and 50 in a driving relationship until a predetermined torsional load is being transmitted thereby, but also functions as a portion of the means for sealing the chamber 92 containing the various components of the coupling device 94. Since the resilient means 72 is connected to the pressure plate by means of the thrust bearing 96, loads will not be induced on the resilient means 72 tending to rotate the same relative to the driven member 14, while the sealing relationship of the chamber 92 will be accommodated by the relative rotation and axial movement of the annular portion 104 and cylindrical portion 98 of the boot 96. It should also be noted that as the cammable means or balls 50 move up the camming shoulder 48 of the camming means 44, and as the balls 50 move along the right face 42 of the flange 40 when the coupling device is uncoupled as a result of overload or overrunning, it is highly desirable that such movement of the balls 50 be accomplished by a rolling action thereof. Since for the true rolling of a ball between two members, it is necessary for the ball to roll relative to both of said members, the thrust bearing 66 has been provided in engagement with the right face of a pressing member 64 so that the pressing member may freely rotate relative to the resilient means 72 and the driven member 14 while the balls 50 are moving up the camming shoulder 48 thus allowing the balls to move with a true rolling action rather than sliding up the camming shoulders 48 and, additionally, prevents the imposition of any torsional loads up the resilient means 72 so that the latter is loaded solely in compression and the useful life thereof is increased and the resilient action thereof is more easily predictable by calculation.

The load of the resilient means 72 upon the balls 50 can be varied in a relatively easy manner without substituting a different resilient means by merely inserting pressing members having a desired axial width; the greater the width of the pressing member, the greater will be the compression of the resilient means and the force with which the resilient means presses upon the balls 50, resulting in the torsional load at which uncoupling of the coupling device 94 occurs being at a correspondingly higher level. Additionally, the resilient elastomeric element 80 of the resilient means 72 as a result of the inherent hysterisis of elastomeric material, when the coupling device 94 is uncoupled, will impose its resilient engaging load in a dampened manner so that the torque values created by the re-engagement action is significantly reduced below the break away or disconnecting torque level.

While a single embodiment of this invention has been shown and described, it is understood that such was for the purpose of describing a preferred embodiment of this invention, and it is readily apparent that many changes therein and adaptations thereof can be made without departing from the scope of this invention as defined in the following claims:

What is claimed is:
1. An overload coupling device for drivingly connecting and disconnecting a driving and driven member comprising in combination:
  (a) camming means drivingly connected to one of said members,
  (b) cammable means for drivingly engaging said camming means in a torque transferring relationship,
  (c) pressing and connecting means drivingly connecting said cammable means to the other of said members and including resilient means for reacting against said other member and pressing said cammable member into a torque transferring relationship with said camming means and for allowing said cammable means to be cammed by said camming means out of driving engagement therewith upon the attainment of predetermined level of torque transfer therebetween,
  (d) said resilient means being disposed peripherally surrounding a portion of the other of said members and sealingly connected thereto and being made from an elastomeric material impervious to the passage of contaminants and lubricant,
  (e) said resilient means constituting a first portion of said pressing and connecting means while the remainder of said pressing and connecting means constituting the other portion thereof,
  (f) and sealing means including said resilient means and other sealing means,
  (g) said other sealing means having a first and a second sealing end and being disposed in a surrounding relationship with a portion of the periphery of said one member and sealingly connected thereto at its first end and sealingly connected to said resilient means at its second end,
  (h) the portion of said other sealing means intermediate its ends peripherally surrounding the other portion of said pressing and connecting means and said camming and cammable means whereby said sealing means and said resilient means effectively seal said other portion and said camming and cammable means.

2. An overload coupling device for drivingly connecting and disconnecting a first shaft to a second shaft disposed coaxially with the first shaft and extending axially in a first direction with respect thereto comprising in combination:
  (a) camming means drivingly connected to said first shaft,
  (b) cammable means disposed axially in said first direction with respect to said camming means for drivingly engaging the latter in a torque transferring relationship,
  (c) pressing and connecting means disposed axially in said first direction with respect to said camming means and drivingly connecting said cammable means to said second shaft,
  (d) said pressing and connecting means including resilient means disposed in said first axial direction with respect to said cammable means for reacting against said second shaft and pressing said cammable means into a torque transferring relationship with said camming means and for allowing said cammable means to be cammed by said camming means out of driving engagement therewith upon the attainment of a predetermined level of torque transference therebetween,
  (e) the remaining portion of said sealing and connecting means other than said resilient means being disposed intermediate said resilient means and said camming means,
  (f) at least a portion of said resilient means being made of an elastomeric material impervious to the passage of contaminants and lubricant and said resilient means circumferentially entirely surrounding a portion of the periphery of said second shaft and sealingly and reactively connected thereto,
  (g) and sealing means including said resilient means and other sealing means with said other sealing means being sealingly connected to said first shaft at a position disposed with respect to said camming means in a direction opposite to said first direction and entirely surrounding and sealingly connected to said first shaft at said position and extending axially in said first direction from said position and peripherally of said camming and cammable means and peripherally surrounding the same, (h) said other sealing means being sealingly connected to a circumferentially extending portion of said resilient means, (i) whereby said other sealing means and said resilient means effectively peripherally seal said camming and cammable means and the portion of said pressing and connecting means other than said resilient means.

3. An overload coupling device for drivingly connecting and disconnecting a first shaft to a second shaft disposed coaxially with the first shaft and extending axially in a first direction with respect thereto comprising in combination:

(a) camming means drivingly connected to said first shaft, (b) cammable means disposed axially in said first direction with respect to said camming means and being movable axially with respect to said camming means for drivingly engaging the latter in a torque transferring relationship and for moving out of engagement therewith, (c) connecting means disposed axially in said first direction with respect to said camming means and drivingly connecting said cammable means to said second shaft for unitary rotation about the axis of the latter while allowing said cammable means to move axially relative to said camming means, (d) a pressing means disposed axially in said first direction with respect to said cammable means and adapted to pressingly engage and urge said cammable means toward said camming means, (e) resilient means disposed axially in said first direction with respect to said pressing means for reacting against said second shaft and biasing said pressing means toward said camming means thereby urging said cammable means into a torque transferring relationship with said camming means and for allowing said cammable means to be cammed by said camming means out of a driving engagement therewith upon the attainment of a predetermined level of torque transference therebetween, (f) said resilient means extending peripherally entirely about a portion of said second shaft and having a first axial end and a second end disposed axially in said first direction with respect to said first end, (g) at least the portion of said resilient means intermediate its ends being made of an elastomeric material impervious to the passage of contaminants and lubricants, (h) means reactively and sealingly connecting the second end of said resilient means to said second shaft and said resilient means being axially compressed with its first end operatively connected to said pressing means, (i) and sealing means including said resilient means and other sealing means, (j) said other sealing means having a first and a second sealing end with the first sealing end thereof being sealingly connected to said first shaft about the entire periphery thereof at a position disposed with respect to said camming means in a direction opposite to said first direction and extending axially in said first direction from the first sealing end thereof and peripherally surrounding said camming and cammable means, said connecting means and said pressing means, (k) the second sealing end of said sealing means being circumferentially sealingly connected to said resilient means adjacent the first end of the latter, (l) whereby said sealing means effectively peripherally seals said camming and cammable means, said connecting means and said pressing means.

4. An overload coupling device according to claim 3 wherein said other sealing means includes an axially extending portion sealingly connected to said first shaft and a second sealing portion formed separate from said first portion and sealingly connected to said resilient means, said other sealing means being made from a substantially rigid yet at least slightly resilient plastic material having a low coefficient of friction, said first sealing portion being rotatable with said first shaft and said second sealing portion being rotatable with said resilient means and said second shaft, and said first and second sealing portions sealingly and relatively rotatably engaging each other.

5. An overload coupling device according to claim 4 wherein thrust bearing means are thrustingly disposed axially intermediate said pressing means and the first end of said resilient means and axially spaces the same, said second sealing portion being disposed axially intermediate said pressing means and the first end of said resilient means and disposed radially outwardly of said thrust bearing means, the axial dimension of said second sealing portion being slightly greater than the axial distance between said pressing and resilient means whereby said second sealing portion pressingly engages said resilient means and rotates unitarily therewith.

6. An overload coupling device according to claim 3 wherein said resilient means comprises first and second annular metallic elements disposed in axially spaced relationship and an annular elastomeric element disposed intermediate said metallic elements and engaging both of the same, said second metallic element being disposed in the first axial direction with respect to said first metallic element so that said first metallice element forms the first end of said resilient means and said second metallic element forms the second end of said second resilient means, both of said metallic elements peripherally engaging the surface of said second shaft, and spacing means including the surface of said shaft and said metallic elements spacing the internal surface of said elastomeric element from said second shaft for allowing said elastomeric element to be axially compressed and expanded radially inwardly without interferingly engaging said second shaft.

7. An overload coupling device according to claim 6 wherein said other sealing means includes an axially extending portion sealingly connected to said first shaft and a second sealing portion formed separately from said first portion, said second sealing portion being annular in form and sealingly connected to said first metallic element of said resilient means, said other sealing means being made from a substantially rigid yet at least slightly resilient plastic material having a low coefficient of friction, said first sealing portion being rotatable with said first shaft and said second sealing portion being rotatable with said resilient means and said second shaft, and said first and second sealing portions sealingly and relatively rotatably engaging each other.

8. An overload coupling device for drivingly connecting and disconnecting a first shaft to a second shaft disposed coaxially with the first shaft and extending axially in a first direction with respect thereto comprising in combination:

(a) camming means drivingly connected to said first shaft, (b) cammable means disposed axially in said first direction with respect to said camming means and being movable axially with respect to said camming means for drivingly engaging the latter in a torque transferring relationship and for moving out of engagement therewith, (c) connecting means disposed axially in said first direction with respect to said camming means and drivingly connecting said cammable means to said second shaft for unitary rotation about the axis of the latter while allowing said cammable means to move axially relative to said camming means, (d) a pressing means disposed axially in said first direction with respect to said cammable means and adapted to pressingly engage and urge said cammable means toward said camming means, (e) resilient means disposed axially in said first direction with respect to said pressing means for reacting against said second shaft and biasing said pressing means toward said camming means thereby urging said cammable means into a torque transferring relationship with said camming means and for allowing said cammable means to be cammed by said camming means out of a driving engagement therewith upon the attainment of a predetermined level of torque transference therebetween, (f) said resilient means extending peripherally entirely about a portion of said second shaft and including a first and a second axially spaced annular metallic element and an annular elastomeric element disposed axially intermediate said metallic elements and connected thereto, (g) said second metallic element being disposed in said first axial direction with respect to said first metallic element and both of said metallic elements engaging the periphery of said second shaft, (h) sealing means including said first metallic element and other sealing means for preventing the intrusion of dirt into the overload coupling device, and (i) means securing said second metallic element to said second shaft against movement in said first direction with respect thereto, and spacing means including the periphery of said second shaft and said metallic elements spacing said elastomeric element from the periphery of said shaft whereby said elastomeric element can be axially compressed and expanded radially inwardly in a radially spaced relationship with respect to the periphery of said shaft.

9. A coupling means according to claim 8 wherein said first shaft has an annular groove formed in the periphery thereof at a position intermediate the engagement between said second shaft and said annular elements whereby the portions of said shaft axially adjoining said annular groove and said metallic elements comprise said spacing means.

References Cited
UNITED STATES PATENTS

| | | | |
|---|---|---|---|
| 2,540,513 | 2/1951 | Dodd | 64—29 X |
| 2,802,354 | 8/1957 | Bohnhoff et al. | 64—29 |
| 2,983,121 | 5/1961 | Naas | 64—29 |
| 3,252,303 | 5/1966 | Weasler et al. | 64—29 |
| 3,263,451 | 8/1966 | Reimer | 64—29 |

FRED C. MATTERN, Jr., *Primary Examiner.*

HALL C. COE, *Examiner.*